Sept. 11, 1962
C. H. ROBERTS
3,053,101
TAPPING TOOL
Filed Aug. 5, 1959
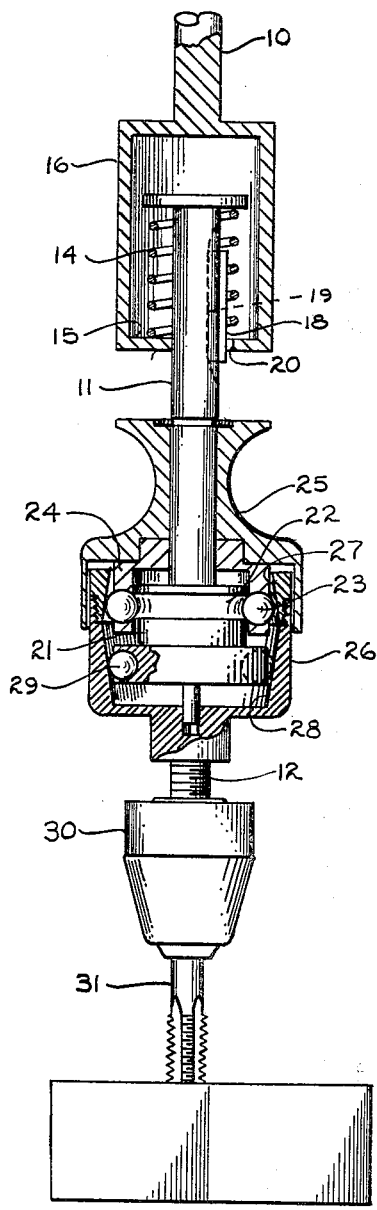
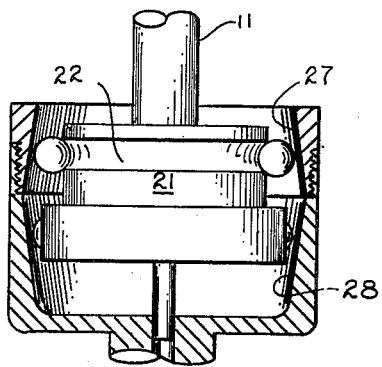
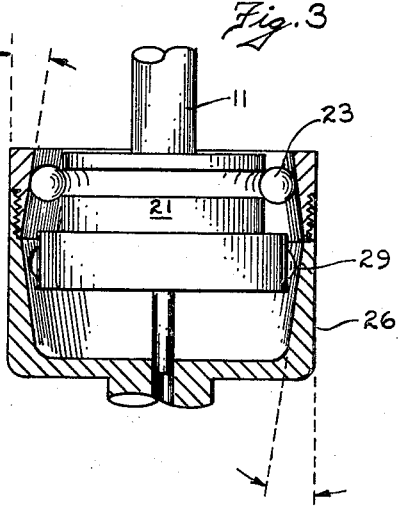
INVENTOR.
CHARLES H. ROBERTS

# United States Patent Office 3,053,101
Patented Sept. 11, 1962

3,053,101
TAPPING TOOL
Charles H. Roberts, 203 N. Lake St., Burbank, Calif.
Filed Aug. 5, 1959, Ser. No. 831,887
2 Claims. (Cl. 74—205)

This invention relates to machine tools and more especially to tools for tapping threads in bored holes.

The object of the invention is to provide a simple, practical, and efficient tool of the character described.

Another object of the invention is to provide a novel and improved tapping tool having superior characteristics.

A further object of the invention is to provide a tapping tool having improved sensitivity. Another object of the invention is to provide a tapping tool responsive to the feel of the operator and capable of instantaneous release from the tapping operation. An additional object of the invention is to provide a novel tapping tool wherein breakage of taps is substantially eliminated even when used with the very smallest thread sizes. Other objects and advantages will become apparent and be brought out more fully in the following specifications reference being had to the accompanying drawing wherein:

FIGURE 1 is a view of section of a tapping tool, embodying the invention, showing the tool in tapping condition.

FIGURE 2 is a partial view in the section showing driving parts in neutral position.

FIGURE 3 is a view similar to FIGURE 2 showing the driving parts in reversing position.

Referring more particularly to the drawing, the tapping tool of this invention is provided with a drive spindle 10 a driving member 11 and a chuck spindle 12. Driving member 11 has a flange head by which it is resiliently supported on a spring 14 which rests on the flanged end 15 of a housing 16 formed integral with or secured to drive spindle 10. A key 18 is positioned in a longitudinal slot 19 formed in driving member 11 and inter-fits in a notch 20 formed in end flange 15 of housing 16. Driving member 11 is formed with a hub 21 having a bearing race groove 22 in which a plurality of balls 23 run. Balls 23 are carried by a ball retaining skirt 24 formed with a part of an operating member 25 which has a slideable mounting on driving member 11. Chuck spindle 12 is formed with an upstanding shell 26 having an internal ball race 27 and a clutch face 28. Ball race 27 and clutch face 28 are tapered as shown. The tapers being mutually converging and each taper is substantially two to eight degrees from the tool axis. A plurality of balls 29 are seated in recesses in hub 21 and make clutching contact with clutch face 28. A chuck 30 is mounted from the threaded lower end chuck spindle 12 and is adapted to receive and drive selected taps 31.

The operation of the spindle should be clear from the foregoing description. During normal drive, the operator will by a slight hold or lift of operator member 25 maintain the parts as shown in FIGURE 2 there being no contact of balls 23 or 29 with either ball race 27 or clutch face 28. The tapping operation is then initiated by a slight downward movement of operating member 25 whereupon there is a clutch engagement of balls 29 with clutch face 28 and the tap 31 enters the bore hole in the work piece. This tapping operation can be stopped instantly at the will of the operator who can "feel" any tendency of the tap to meet unusual resistance which might otherwise break the tap. Upon a lift of operating member 25 the driving member 11 and hub 21 will be shifted upwardly, whereupon balls 23 will engage ball race 27 and, inasmuch as ball retaining skirt 24 is stationary, balls 23 will act as rollers or gears and chuck spindle 12 will be driven in the reverse direction to thereupon run the tap 31 out from its threaded hole in the work piece.

What is claimed is:

1. A tapping tool comprising a hollow drive spindle, a driving member extending into said hollow drive spindle and reciprocable therein, resilient means within said drive spindle biasing said driving member relative to said drive spindle, drive means operatively connecting said drive spindle to said driving member, said driving member having a hub including a ball race and a ball clutch member, a hollow chuck spindle surrounding said hub and having a tapered outer ball race and an oppositely tapered clutch member, balls disposed within said race, means to shift said driving member and hub, said means to shift including a retaining skirt operatively associated with said balls so as to effect a selective drive of said chuck spindle by said ball clutch member in a tapping direction and means for restraining rotation of said skirt so as to transmit motion by said balls in a reverse direction.

2. A structure as set forth in claim 1, wherein the resilient means wihnin the hollow drive spindle is a coil spring.

References Cited in the file of this patent
UNITED STATES PATENTS

| 1,545,243 | Fletcher | July 7, 1925 |
| 1,846,879 | Kurth | Feb. 23, 1932 |
| 2,795,146 | Alfredeen | June 11, 1957 |

FOREIGN PATENTS

| 19,499 of 1904 | Great Britain | Aug. 24, 1905 |